No. 860,564. PATENTED JULY 16, 1907.
W. D. PAYNTER & F. A. BASTIAN.
CHUCK.
APPLICATION FILED OCT. 13, 1906.
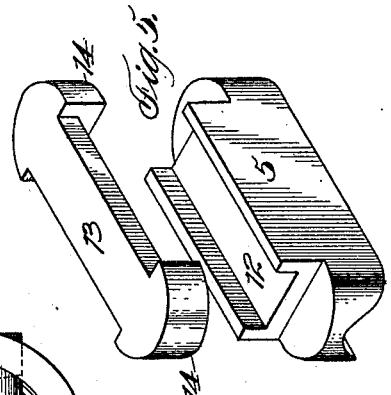
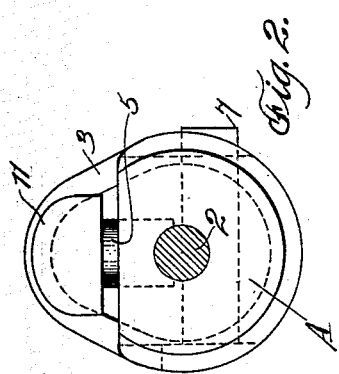
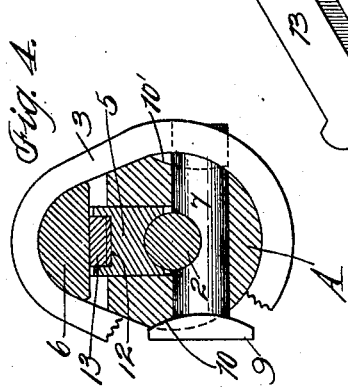
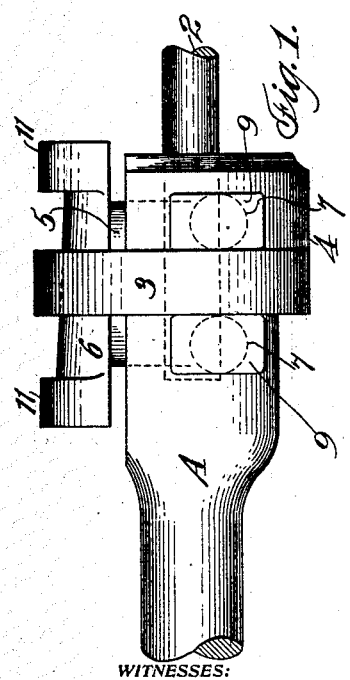
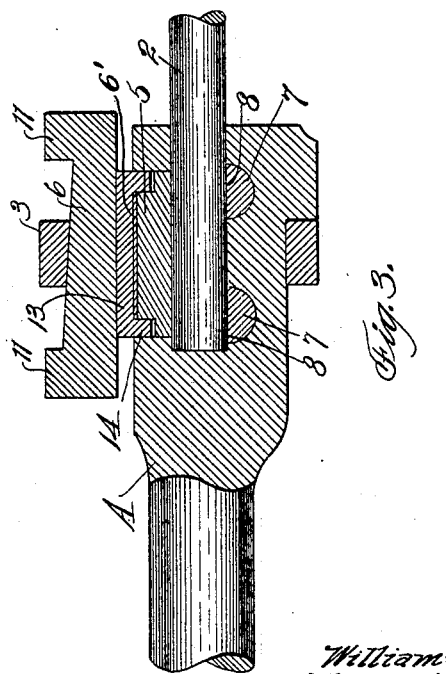
WITNESSES:
INVENTORS.
William D. Paynter and
Frederick A. Bastian
BY
Geo. H. String
ATTORNEY

UNITED STATES PATENT OFFICE.

WILLIAM D. PAYNTER AND FREDERICK A. BASTIAN, OF GRASS VALLEY, CALIFORNIA.

CHUCK.

No. 860,564.        Specification of Letters Patent.        Patented July 16, 1907.

Application filed October 13, 1906. Serial No. 338,735.

*To all whom it may concern:*

Be it known that we, WILLIAM D. PAYNTER and FREDERICK A. BASTIAN, citizens of the United States, residing at Grass Valley, in the county of Nevada and State of California, have invented new and useful Improvements in Chucks, of which the following is a specification.

Our invention relates to rock-drilling machines, and especially to drill chucks for the same. Its object is to provide a time- and labor-saving chuck, which will permit a drill to be easily and quickly put in or taken out without the tightening or loosening of any bolts or nuts; which will securely hold the drill in working position, and which will provide a simple means for taking up wear.

The invention consists of the parts and the construction and combination of parts as hereinafter more fully described and claimed, having reference to the accompanying drawings, in which—

Figures 1 and 2 are respectively side and end views of the chuck. Fig. 3 is a longitudinal section, and Fig. 4 a transverse section; both vertical of the chuck. Fig. 5 shows the gib in detail.

A represents the chuck having the usual recess or socket to receive a drill rod as 2. 3 is a removable ring surrounding the head and abutting against a shoulder 4 on the underside of the chuck to assist in preventing the ring slipping forward by reason of the impact of the drill on the rock.

The top of the chuck under the ring, when the latter is in position, has a slot or opening to receive a removable gib 5 which contacts with the drill 2. A tapered key or wedge 6 is adapted to act on the gib and against the ring to bind the gib against the drill to hold the drill in position.

The drill rod is supported in the chuck in opposition to the gib upon the two pins or bushing-members 7, which latter are inserted sidewise through the chuck, one on each side of the ring 3 and below the longitudinal center of the drill rod. These bushings have concavities 8 on their top sides corresponding with the socket in the chuck and the size of the drill to be supported. These pins or bushings 7 are provided with heads 9, which latter seat in suitable recesses 10 in the side of the chuck. The opposite side of the chuck is correspondingly recessed or concaved as shown at 10′ to allow the end of the bushings to protrude sufficiently to either receive a cotter pin or like securing means, or have their split ends separated by means of a cold-chisel, whereby the bushings are prevented from accidentally falling out of the chuck.

The key bushings 7 in addition to forming the bottom seats for the drill shanks also operate as guides to hold the ring in place on the chuck. The tightening wedge or key 6 is provided with suitable heads 11 at each end to prevent it falling away from the ring. When the key 6 is backed up so as to allow the gib to move outward a drill rod can be easily inserted into the chuck.

When the drill is placed in the chuck, the first stroke of the machine after the power is turned on tightens the drill. This is caused by the sudden stoppage of the parts when the drill strikes the rock, and as a result the wedge key is driven forward and wedges itself in between the ring and the gib; the latter in turn presses on the shank of the drill, and every stroke thereafter helps to keep the key tight. The return stroke being cushioned there is no tendency for the key to loosen itself. To release the drill all that is necessary is to hit the front end of the key with a pick or hammer, whereupon the drill can be easily removed.

The key bushings 7 in conjunction with the gib offer a 3-point-contact on the drill-shank with great gripping power.

After the machine has run awhile, the ring 3 which is a forging without finish, may become worn so as to fit the chuck rather loose, or the drill shank and key-bushing may become so worn, that the tightening key 6 will travel forward too far. Therefore we prefer to make the gib in sections which can be separated and allow a shim 6′ to be inserted so as to compensate for wear and cause the key to operate again in the most advantageous manner. While this sectional gib may be made in a variety of forms, we prefer to make it as shown in Fig. 5 in which the main portion of the gib, or that which is adapted to bear on the drill rod, is channeled lengthwise as shown at 12 to receive the top section 13 which fits into this channel and has the enlarged ends 14 to fit the corresponding seats in the complementary section.

The gib and bushings are preferably made of hardened steel so as to reduce liability of wear to a minimum. A machine equipped with a chuck of this description has been in actual operation for sometime and has given utmost satisfaction.

Having thus described our invention, what we claim and desire to secure by Letters Patent is—

1. A chuck for a rock-drill having a socket to receive the drill-shank, a gib carried by the chuck and adapted to bear on the drill-shank, a ring loosely fitting the chuck and circumscribing the outer sides thereof, a tapered-key passing through the ring and bearing on the gib, key-bushings passing sidewise through the chuck and intersecting said socket and forming a bottom seat for the drill-shank in opposition to said gib.

2. A chuck having a receiving socket, a sectional gib carried by the chuck and movable into and out of the socket, a ring removably fitting the chuck, and a tapered-key passed through the ring and bearing on the gib.

3. A chuck having a receiving socket, a sectional gib
5 carried by the chuck and movable into and out of the socket, a ring removably fitting the chuck, a tapered-key passed through the ring and bearing on the gib, and key-bushings passed transversely through the chuck and below the axis of the socket and intersecting the socket.

In testimony whereof we have hereunto set our hands in 10 presence of two subscribing witnesses.

WILLIAM D. PAYNTER.
FREDERICK A. BASTIAN.

Witnesses:
JAMES A. RICHARDS,
EDWARD TREUHELLA.